United States Patent [19]
Aiyama et al.

[11] Patent Number: 5,426,856
[45] Date of Patent: Jun. 27, 1995

[54] HAND-HELD GARDENING MACHINE

[75] Inventors: Fumihiko Aiyama, Musashimurayama; Takayuki Yamamoto, Tokyo; Hisato Oosawa, Hamura; Yoetsu Yokocho, Ohme, all of Japan

[73] Assignee: Kioritz Corporation, Tokyo, Japan

[21] Appl. No.: 248,866

[22] Filed: May 24, 1994

[30] Foreign Application Priority Data

Jun. 1, 1993 [JP] Japan .............................. 5-029122 U

[51] Int. Cl.⁶ ............................................. B26B 19/02
[52] U.S. Cl. ...................................... 30/208; 30/223; 30/233
[58] Field of Search ................. 30/194, 196, 208, 233, 30/233.5, 228, 210, 215, 216, 223

[56] References Cited

U.S. PATENT DOCUMENTS

| 3,161,954 | 12/1964 | Riley et al. |
| 3,293,746 | 12/1966 | Maxson |
| 3,564,714 | 2/1971 | Wells |
| 3,934,340 | 1/1976 | Jones et al. |
| 4,592,143 | 6/1986 | Pizzuto et al. |
| 4,619,045 | 10/1986 | Mayer ................................ 30/216 |

Primary Examiner—Hwei Siu Payer
Attorney, Agent, or Firm—Cushman, Darby & Cushman

[57] ABSTRACT

A hand-held gardening machine includes a pair of upper and lower clipper blades each formed with clipper teeth. The clipper blades are caused to slidably reciprocate in a longitudinal direction thereof by means of output from a power source. A comb-like safety plate is formed with protrusions protruding beyond the tips of the teeth. The positions at which the protrusions of the safety plate are located are selectable from overlapping positions of the teeth of the clipper blades and positions shifted from the overlapping positions.

4 Claims, 5 Drawing Sheets

HAND-HELD GARDENING MACHINE

BACKGROUND OF THE INVENTION

1. Field of the Invention

The present invention relates to a hand-held gardening machine such as a hedge trimmer. In particular, a hand-held gardening machine comprising a pair of upper and lower clipper blades which are caused to reciprocate.

2. Description of the Prior Art

In general, a hand-held gardening machine of this type uses output from a power source such as an internal combustion engine or an electric motor to cause a pair of upper and lower elongate clipper blades to reciprocate relative to each other in a longitudinal direction thereof.

In recent years, various safety standards as safety measures have been tending to be established in many countries in view of increasing accidents caused in working such as trimming operation. For example, a trimmer comprising clipper blades falls under such safety standards, because an operator is exposed to a possible danger, in particular, a serious accident due to contact between the clipper blade(s) and operator's leg or the like during operation. To meet such requirements, a comb-like safety plate is mounted above or below the upper and lower blades supported slidably each other. FIG. 8 shows a clipper blade working portion of such a hand-held gardening machine.

In FIG. 8, clipper blades 40, 50 which are laid one on top of the other are held, for example, between a comb-like safety plate 60 having protrusions 61, 61, . . . which is located below the bottom surface of the lower clipper blade 50 and a supporting plate 70 which is located above the top surface of the upper clipper blade 40, and supported slidably to-and-fro by means of mounting means 71 such as a screw.

The protrusions 61, 61, . . . are so formed that tips thereof protrude beyond tips of the teeth 41, 41, . . . and 51, 51, . . . by $d_1$ (for example, 8 mm or more). It is prescribed in the safety standard (UL standard) that when operator's leg M of a diameter assumed to be, for example, 120 mm is brought in contact with the protrusions 61, 61 of the safety plate 60 which are adjacent to each other, the distance between the tip of the tooth 41 or 51 and the portion of the leg M which is closest thereto is $d_2$ (for example, 4 mm or more), in terms of safety measures.

As seen from FIG. 8, each of the pitches between neighboring teeth 41 and 41 and between neighboring teeth 51 and 51 of the upper and lower clipper blades 40, 50 and the pitch between neighboring protrusions 61 and 61 of the safety plate 60 are formed to be equal.

As shown in FIG. 8 by the solid line, the teeth 41, 41, . . . and 51, 51, . . . are so mounted as to overlap each other at their starting points of stroke (hereinafter referred to as a first dead center). In the following description, explanation will be given only on neighboring two teeth 41, 51, and protrusions 61, 61 as a matter of convenience. Needless to say, however, the same operation is true of other counterparts.

The upper and lower blades 40, 50 are respectively formed with elongate holes 42, 52 which allow relative movement thereof with respect to the screw 71 (the supporting plate 70) so that the teeth 41, 51 initiate reciprocating motion from the first dead center as a starting point and overlap again at the position shown in FIG. 8 by the chain-double dotted line (hereinafter referred to as a second dead center) to terminate forward stroke. The longitudinal length of each of the elongate holes 42, 52 is equal to stroke S (travel) of each of the teeth 41, 51, and this is equal to the distance between the first dead center and the second dead center.

The protrusion 61 of the safety plate 60 is so fixedly mounted by means of the screw 71 as to overlap the overlapping position of the teeth 41, 51 at their first dead centers.

By this structure, the upper tooth 41 at position II and the lower tooth 51 at position I when present at their first dead centers are adapted to overlap together at position III when present at their second dead centers and then return to the original positions at the end of return stroke. In this connection, the relationship between the positions I, II, III and the stroke S is as shown in FIG. 3. Thus, the upper and lower teeth 41, 51 is adapted to cut a plant A or the like in the course of the forward stroke from the first dead center to the second dead center.

In such a conventional hand-held gardening machine as described above, however, a plant or the like having a small diameter is likely to be caught in the gap between the tooth 41 or 51 and the protrusion 61 during the return stroke of the tooth 41 or 51 from the second dead center to the first dead center. Inconveniently, as described later in detail, it is difficult to cut the thus caught plant completely because no edge is formed on either side of the protrusion 61 of the safety plate 60. In such a condition that the slender branch or the like is involved as a foreign obstacle in the gap between the tooth 41 or 51 and the protrusion 61, there is a problem that the upper and lower clipper blades 40, 50 are prevented from smoothly reciprocating to result not only in lowered operational efficiency but also in increased power loss.

SUMMARY OF THE INVENTION

The present invention has been made in view of the problems inherent in the conventional hand-held gardening machine. It is, in particular, an object of the present invention is to provide a hand-held gardening machine which is capable of attaining optimum application of the safety plate according to objects to be trimmed or operational situation, thereby enabling ensured safety and improved operational efficiency to be realized, and yet which is capable of attaining improved durability of a hand-held gardening machine to be attained.

To attain the above-mentioned objects, a hand-held gardening machine according to the present invention comprises:

a pair of upper and lower clipper blades each formed with clipper teeth, said clipper blades being caused to slidably reciprocate in a longitudinal direction thereof by means of output from a power source; and a comb-like safety plate formed with protrusions and mounted above or below the teeth, tips of said protrusions protruding beyond the tips of said teeth;

and characterized in that positions at which said protrusions of said safety plate are located are selectable from overlapping positions of said teeth of said clipper blades and positions shifted from said overlapping positions.

In the hand-held gardening machine according to the present invention which is constructed as described above, positions at which said protrusions of said safety plate are located are selectable from overlapping positions of said teeth of said clipper blades and positions shifted from said overlapping positions. By virtue of this, the positions where the teeth of the clipper blades perform their strokes relative to the protrusions of the safety plate can be shifted by shifting the mounting position of the safety plate.

DESCRIPTION OF THE PREFERRED EMBODIMENTS

Figure 1:
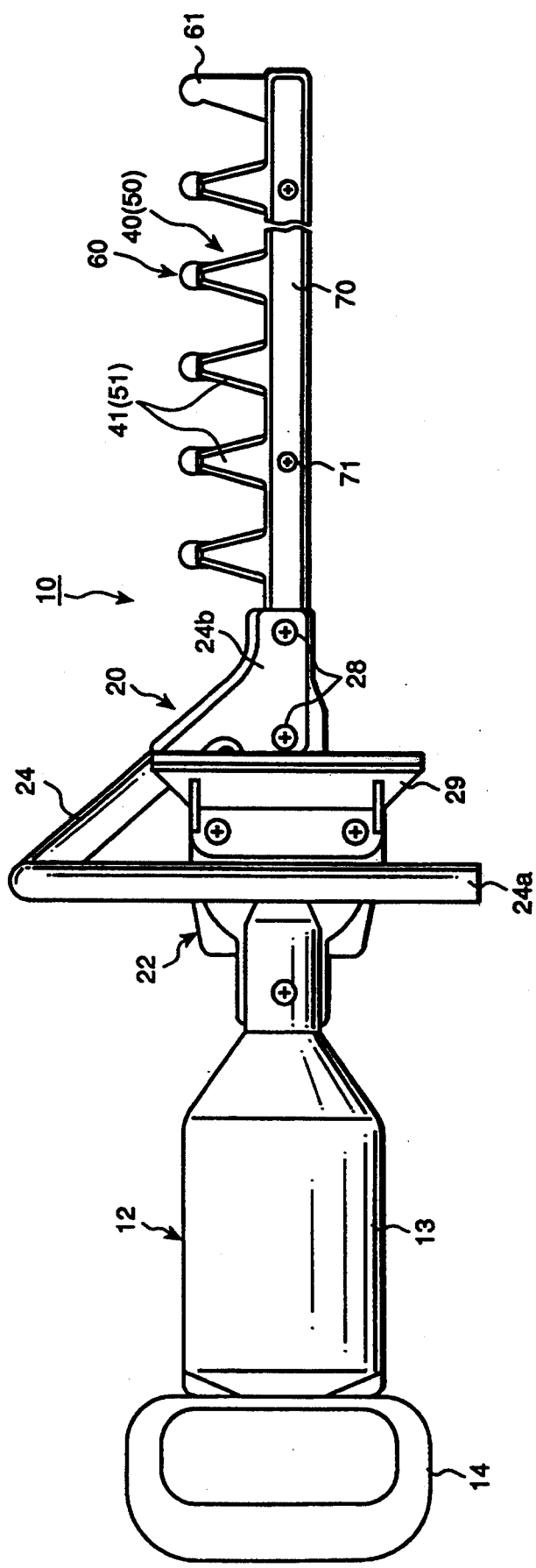
FIG. 1 is a plan view generally showing an embodiment of the hand-held gardening machine according to the present invention.
Figure 2:
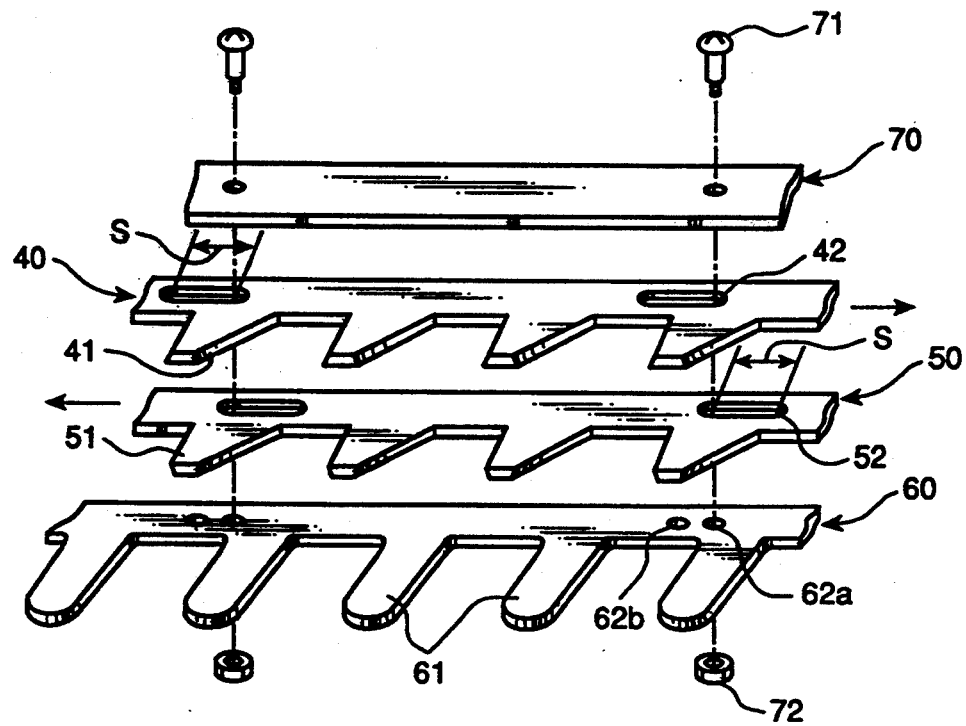
FIG. 2 is an exploded perspective view of a clipper blade working portion.

Now, an embodiment of the present invention will be described with reference to the accompanying drawings. FIG. 1 is a plan view showing an embodiment of a hedge trimmer as one of the hand-held gardening machines according to the present invention. FIG. 2 is a perspective exploded view of a clipper blade working portion. In the drawings given for illustrating embodiments of the present invention, the same reference number are allotted to the parts as allotted to the corresponding parts of the above-described conventional hand-held gardening machine shown in FIG. 8 to eliminate overlapping explanation.

The illustrated trimmer 10 comprises a driving portion 12 and a working portion 20 detachable from the driving portion 12. The driving portion 12 includes an outer case 13 having its rear end horizontally mounted with a rear handle 14, and an electric motor (not shown) fixedly disposed in the outer case 13.

On the other hand, the working portion 20 includes a pair of upper and lower clipper blades 40 and 50, and a casing member 22 covering the rear ends of the clipper blades and composed of vertically separable parts. The upper and lower blades 40 and 50 each has a plurality of substantially triangular teeth 41, 41 and 51, 51 . . . , respectively. Onto the upper portion of the casing member 22, a base 24b of a front handle 24 having a grip portion 24a is fixed by means of screws 28, 28, and a hand guard 29 is fixed in front of the front handle 24 by means of screws.

Although no particular illustration is given, rotational driving force of the motor in the driving portion 12 is transmitted to the upper and lower clipper blades 40, 50 via a conventional means such as an eccentric cam, thereby causing the upper and lower clipper blades 40, 50 to reciprocate, in opposite phases with each other, in the longitudinal direction thereof.

As shown in FIG. 2, the structure of the working portion of the clipper blade according to the present invention are basically the same as that of conventional one, and hence detailed explanation is omitted. In addition to the conventional structure, however, the structure of the present invention has the following additional characteristic structural feature.

In the safety plate 60 are formed by perforation two mounting holes 62a, 62b which enable adjustment of the relative position between the safety plate 60 and the upper and lower clipper blades 40, 50. The distance between the mounting holes 62a and 62b is set to be, for example, in the illustrated embodiment, half of stroke S (travel) of reciprocating motion of each of the upper and lower teeth 41, 51. In other words, as described in detail below, the traveling positions of the teeth 41, 41, . . . and 51, 51, . . . relative to the protrusions 61, 61, . . . are shifted between a condition where the screw 71 is inserted through the inner mounting hole 62a for mounting the safety plate 60 and another condition where the screw 71 is inserted through the outer mounting hole 62b for mounting the safety plate 60. Accordingly, the overlapping position of the upper and lower teeth 41, 51 is shiftable by half of the stroke, i.e., S/2 relative to the protrusion 61.

Figure 3:
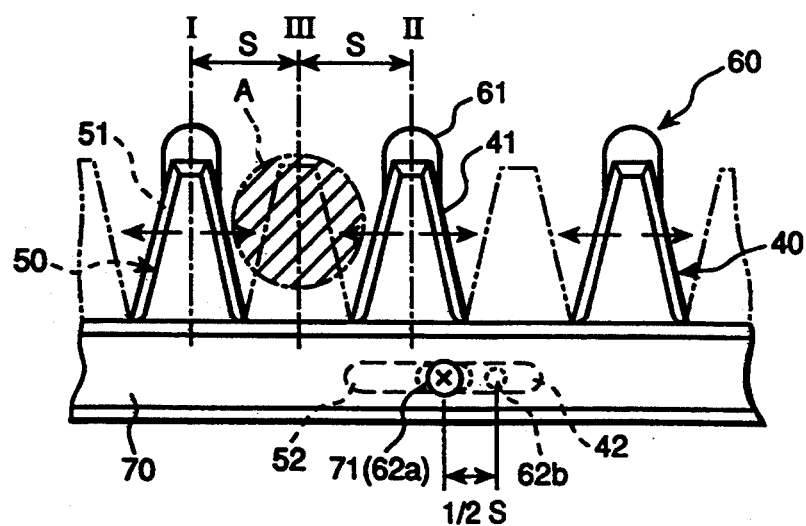
FIG. 3 shows one mode of use of the clipper blade working portion of the embodiment according to the present invention shown in FIG. 2.
Figure 4:
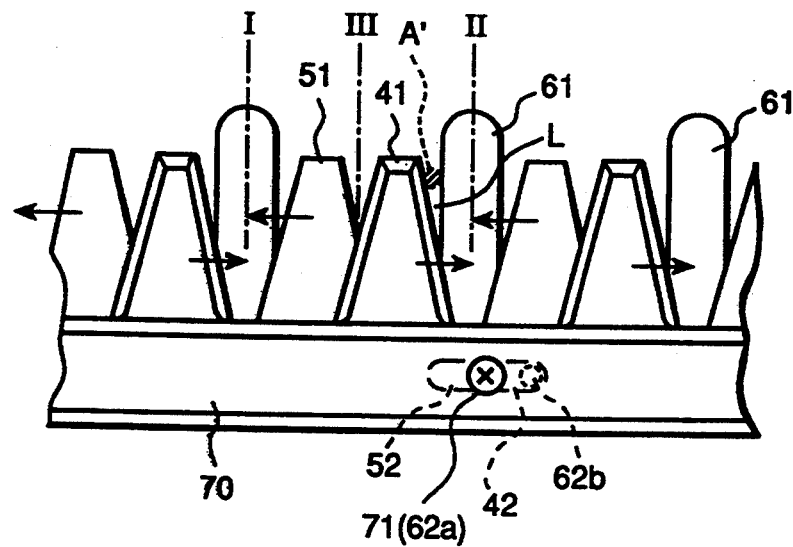
FIG. 4 shows one mode of use of the clipper blade working portion of the embodiment according to the present invention shown in FIG. 3.

FIGS. 3 and 4 show one mode of use of the working portion in the clipper blade of the embodiment according to the present invention shown in FIG. 2. In this illustrated mode, the screw 71 is inserted through the inner one 62a of the mounting holes of the safety plate 60 and screwed into a nut 72.

Figure 8:
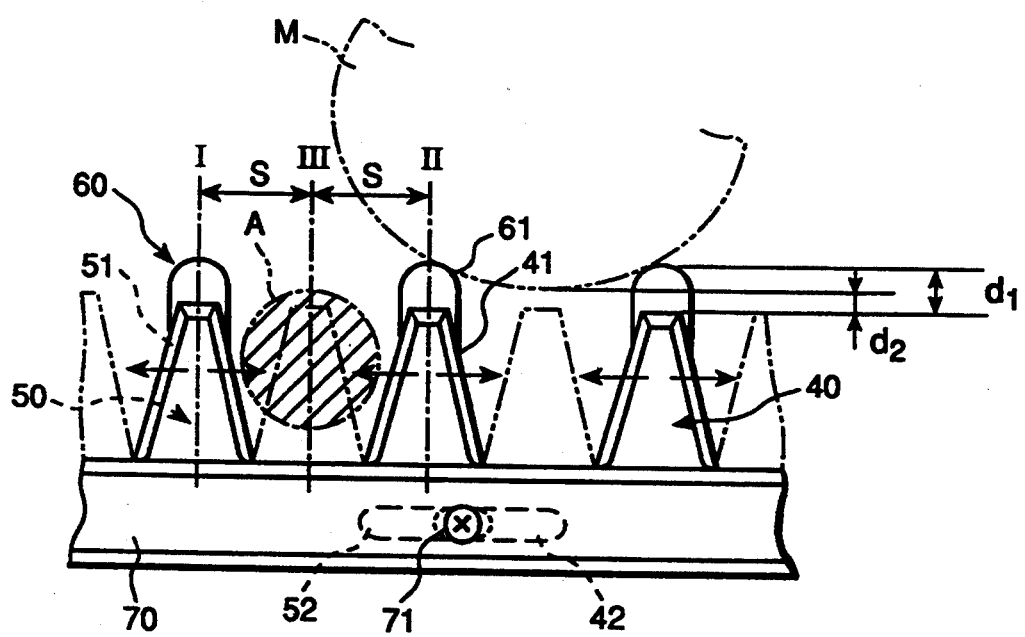
FIG. 8 is a plan view of a clipper blade working portion of a conventional hand-held gardening machine.

The embodiment employing the mode shown in FIGS. 3 and 4 exhibits the same function as that of the conventional one shown in FIG. 8, and hence detailed description is omitted. Incidentally, FIG. 4 shows the upper and lower teeth 41, 51 in the course of the return stroke from the second dead center to the first dead center. In FIG. 4, the upper and lower teeth 41, 51 are shown in mid course of returning from the overlapping position (second dead center) at the position III to the dead centers at the positions II and I, respectively. If a plant or the like A' of a small diameter is caught in a gap L between the upper tooth 41 and the protrusion 61 at the position II in the course of the return stroke, it is difficult to cut the plant or the like A' completely because no edge is formed on either side of the protrusion 61. In such a condition that the plant A' is involved in the gap L as a foreign obstacle, the upper and lower clipper blades 40, 50 are prevented from smoothly reciprocating to result not only in lowered operational efficiency but also in increased power loss, as described above.

As is understood from the above description, although the embodiment employing the mode illustrated in FIGS. 3 and 4 is not suitably used for a plant and the like A' having a relatively small diameter, it is capable of cutting a plant A having a diameter substantially equal to the distance between the protrusions 61, 61 neighboring each other (maximum cuttable branch diameter).

Figure 5:
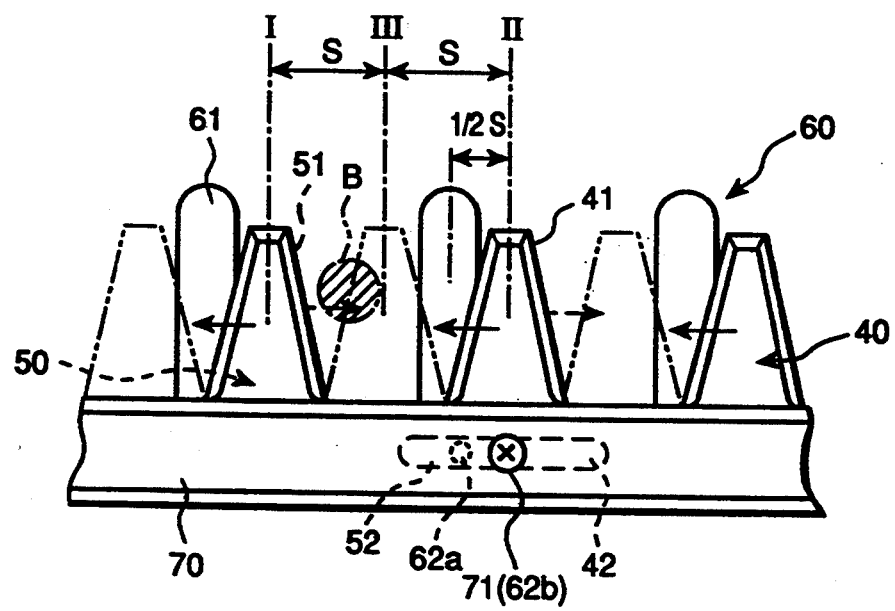
FIG. 5 shows the other mode of use of the clipper blade working portion of the embodiment according to the present invention shown in FIG. 2.
Figure 6:
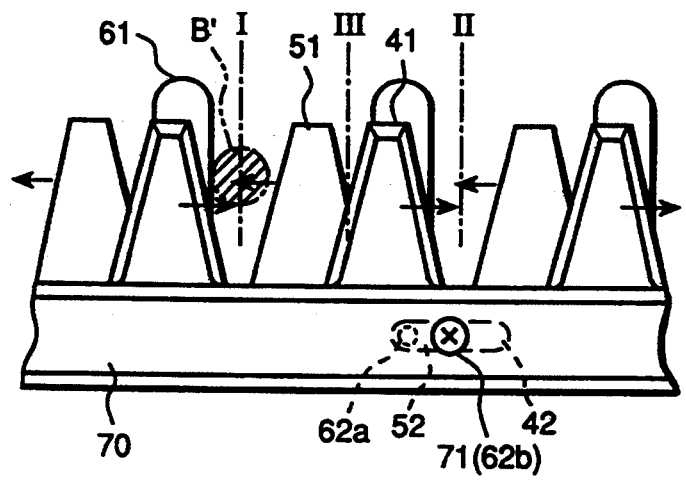
FIG. 6 shows the other mode of use of the clipper blade working portion of the embodiment according to the present invention shown in FIG. 5.

On the other hand, FIGS. 5 and 6 show the other mode of use of the working portion in the clipper blade of the embodiment according to the present invention shown in FIG. 2. In this illustrated mode, the screw 71 is inserted through the outer mounting hole 62b of the safety plate 60 and screwed into a nut 72. The positional relationships between the upper and lower teeth 41, 51 in FIGS. 5 and 6 corresponds to the above-described positional relationships therebetween in FIGS. 3 and 4, respectively. In other words, FIG. 5 shows the teeth in forward stroke from the first dead center (shown by a solid line) to the second dead center (shown by a chain-double dotted line). On the other hand, FIG. 6 shows teeth in the course of return stroke from the second dead center to the first dead center.

The embodiment employing the mode of use illustrated in FIGS. 5, 6 is basically the same as the above-described embodiment employing the mode of use illustrated in FIGS. 3, 4 and is different therefrom only in that the safety plate 60 and, in consequence, the protrusions 61, 61 are located at the position shifted in one direction (left direction in FIGS. 5, 6) by half of the stroke S/2 relative to the teeth 41, 51 of the upper and lower clipper blades 40, 50. Accordingly, overlapping explanation is omitted. Also in the mode shown in FIGS. 5, 6, as in the mode shown in FIGS. 3, 4, the upper tooth 41 and the lower tooth 51 are adapted to be present at the position II and the position I, respectively, when they are at their first dead centers, and to overlap each other at the position III when they are at their second dead centers.

Thus, as in the mode in FIG. 3, a plant or the like B is cut in the course of forward stroke from the first dead center to the second dead center (see FIG. 5).

On the other hand, also in the course of return stroke from the second dead center to the first dead center, a plant or the like B' is unfailingly cut off (see FIG. 6). Further, as is apparent from FIG. 6, a branch or the like is prevented from being caught between the tooth 41 or 51 and the protrusion 61, thereby enabling occurrence of incomplete cutting to be eliminated.

Accordingly, in this illustrated mode, although the maximum cuttable branch diameter is small as compared with the condition shown in FIGS. 3 and 4, even a plant B' having relatively small diameter or the like is unfailingly cut off.

As described above, in this embodiment, the relative positional relationship between the overlapping position of the teeth 41, 51 formed on the upper and lower clipper blades 40, 50 and the protrusion 61 formed on the safety plate 60 is adjustable in the longitudinal direction by changing the mounting hole 62a or 62b through which the screw 71 is inserted, thereby enabling suitable manner for use to be attained according to objects to be trimmed and type of operation. Accordingly, improved operational efficiency can be realized.

Figure 7:
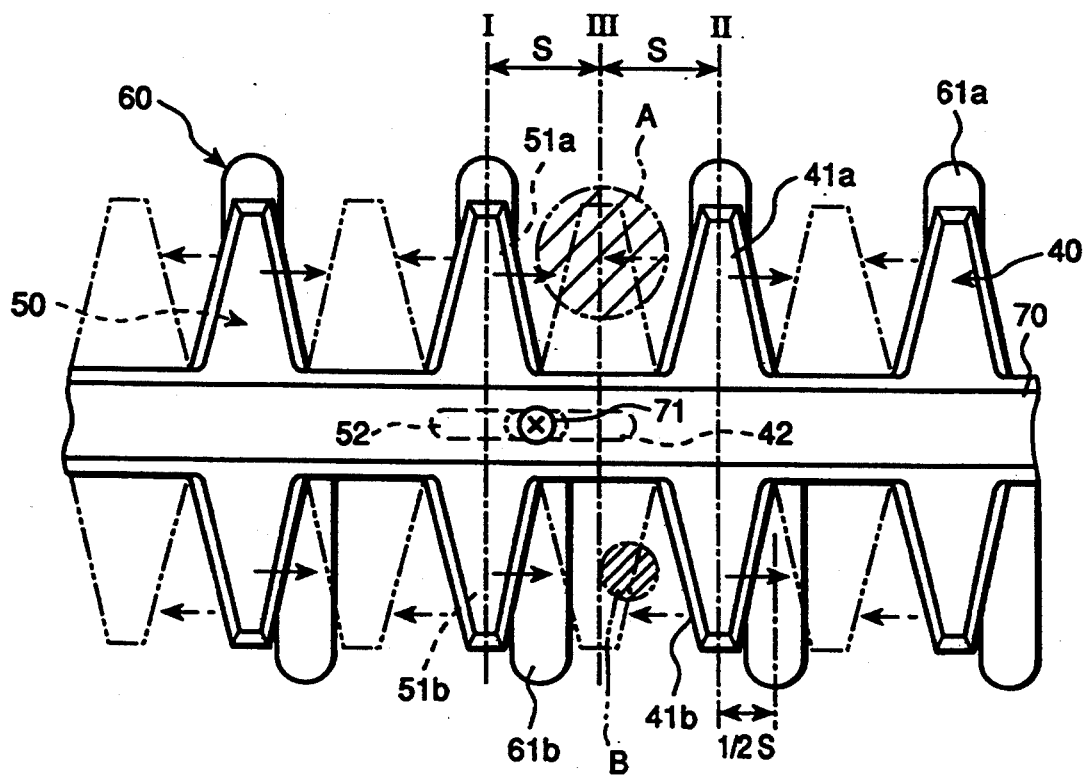
FIG. 7 shows a clipper blade working portion of another embodiment according to the present invention.

In the next place, another embodiment of the working portion of the clipper blades according to the present invention will be described with reference to FIG. 7. In FIG. 7, the same reference numbers are allotted to the parts as allotted to the functionally equivalent parts of the embodiment shown in FIGS. 2 to 6. Accordingly, overlapping explanation is omitted.

In the embodiment illustrated in FIG. 7, as the upper and lower clipper blades 40 and 50, there are used double-toothed clipper blades respectively formed with teeth 41a, 41a, ..., 41b, 41b, ..., and 51a, 51a, ..., 51b, 51b which extend, in pairs along the longitudinal axes thereof, in right and left directions relative to the longitudinal direction thereof. In this connection, the pitch between the teeth and the stroke S of the upper and lower clipper blades 40, 50 are the same as those of the embodiment shown in FIGS. 2 to 6. A solid line and a chain-double dotted line show overlapping positions of the teeth at the first and second dead centers, respectively.

With respect to the embodiment shown in FIG. 7, in the side on which the upper and lower teeth 41a, 51a, i.e., ones of the above-mentioned pairs are provided (upper side in FIG. 7), the protrusion 61a of the safety plate 60 is so located as to overlap with the overlapping position of the teeth 41a and 51a at the first dead center, as in the mode shown in FIGS. 3 and 4.

On the other hand, in the side on which the upper and lower teeth 41b, 51b, i.e., the others of the pairs are provided (lower side in FIG. 7), the protrusion 61b of the safety plate 60 is so located as to be shifted by half stroke (S/2) from the overlapping position of the teeth 41b and 51b at the first dead center, as in the mode shown in FIGS. 5 and 6.

In this embodiment, there are provided in combination the structure corresponding to the mode shown in FIGS. 2 to 4 in one side along the longitudinal direction of the upper and lower clipper blades 40, 50 (upper side in FIG. 7) and the structure corresponding to the mode shown in FIGS. 5 and 6 in the other side (lower side in FIG. 7). Accordingly, in this embodiment, the right side of the clipper blades 40, 50 on which the teeth 41a, 51a are formed and the left side on which the teeth 41b, 51b are formed can selectively be used without changing the mounting hole 62a or 62b through which the screw 71 is inserted. Consequently, suitable manner for use can readily be attained according to objects to be trimmed or type of operation.

In the above, the specific embodiments of the present invention have been described in detail. However, it should be understood that the present invention is by no means restricted to the embodiments, and that various modifications may be made without departing from the scope of the invention defined by the claims.

For example, the distance between the mounting holes 62a and 62b for the screw 71 is not restricted to half stroke S/2 but may be appropriately selected. Further, the mounting holes are not restricted to being formed at two positions and may of course be formed at more positions.

Incidentally, it is also possible that screws 71 are placed at the same intervals at positions appropriately shifted from the dead centers of the clipper blades 40, 50 and mounting holes 62 one-to-one corresponding to the screws 71 are formed in the safety plate 60 and the safety plate 60 is mounted in reversed manner in the longitudinal direction.

As understood from the above description, according to the present invention, optimum application of the safety plate can be attained which is well-adapted to objects to be trimmed or operational situation, thereby enabling ensured safety and improved operational efficiency to be realized, and yet improved durability of a hand-held gardening machine can be attained.

What is claimed is:
1. A hand-held gardening machine comprising:
upper and lower clipper blades including cutting teeth extending horizontally from at least one side thereof, said clipper blades being constructed and arranged to reciprocate in opposite phases with each other in the longitudinal direction thereof; and a safety plate including spaced apart protrusions extending horizontally from at least one side thereof, said safety plate being mounted relative to said upper and lower clipper blades such that tips of said protrusions extend beyond tips of said teeth, said safety plate including at least one pair of spaced apart mounting holes such that a distance between said mounting holes is generally equal to one-half of a stroke of the reciprocating motion of the cutting teeth, whereby the relative mounted and operating positions between said safety plate and said upper and lower clipper blades can be adjusted by selectively mounting said upper and lower clipper blades to said safety plate via one of said mounting holes.

2. The hand-held gardening machine according to claim 1, wherein said mounting holes include two pairs of mounting holes provided in said safety plate.

3. The hand-held gardening machine according to claim 1, wherein each said upper and lower clipper blades includes a slot therein having a length generally equal to one stroke of a tooth of said clipper blades, said slot being constructed and arranged to cooperate with said mounting holes to couple said safety plate to said clipper blades.

4. A hand-held gardening machine as in claim 1 wherein said protrusions extend from two opposite sides of said safety plate, said cutting teeth extend horizontally from two opposite sides of each of said upper and lower clipper blades, said cutting teeth on one side of each said upper and lower clipper blades being arranged to have dead center positions aligned with the protrusions on that side, said cutting teeth on the opposite side of each said upper and lower clipper blades being arranged to have dead center positions located one-half a stroke length away from said protrusions on that opposite side.

* * * * *